Dec. 6, 1955 F. H. HANLEY 2,726,281

TELEGRAPH CODE SIGNAL TRANSMITTER

Original Filed July 27, 1948

INVENTOR
F. H. HANLEY
BY John E Cassidy
ATTORNEY 2,726,281

TELEGRAPH CODE SIGNAL TRANSMITTER

Frank Harold Hanley, Butler, N. J., assignor to American Telephone and Telegraph Company, a corporation of New York Original application July 27, 1948, Serial No. 40,952, now Patent No. 2,625,608, dated January 13, 1953. Divided and this application June 25, 1952, Serial No. 295,473

5 Claims. (Cl. 178—69)

Figures 1, 2:
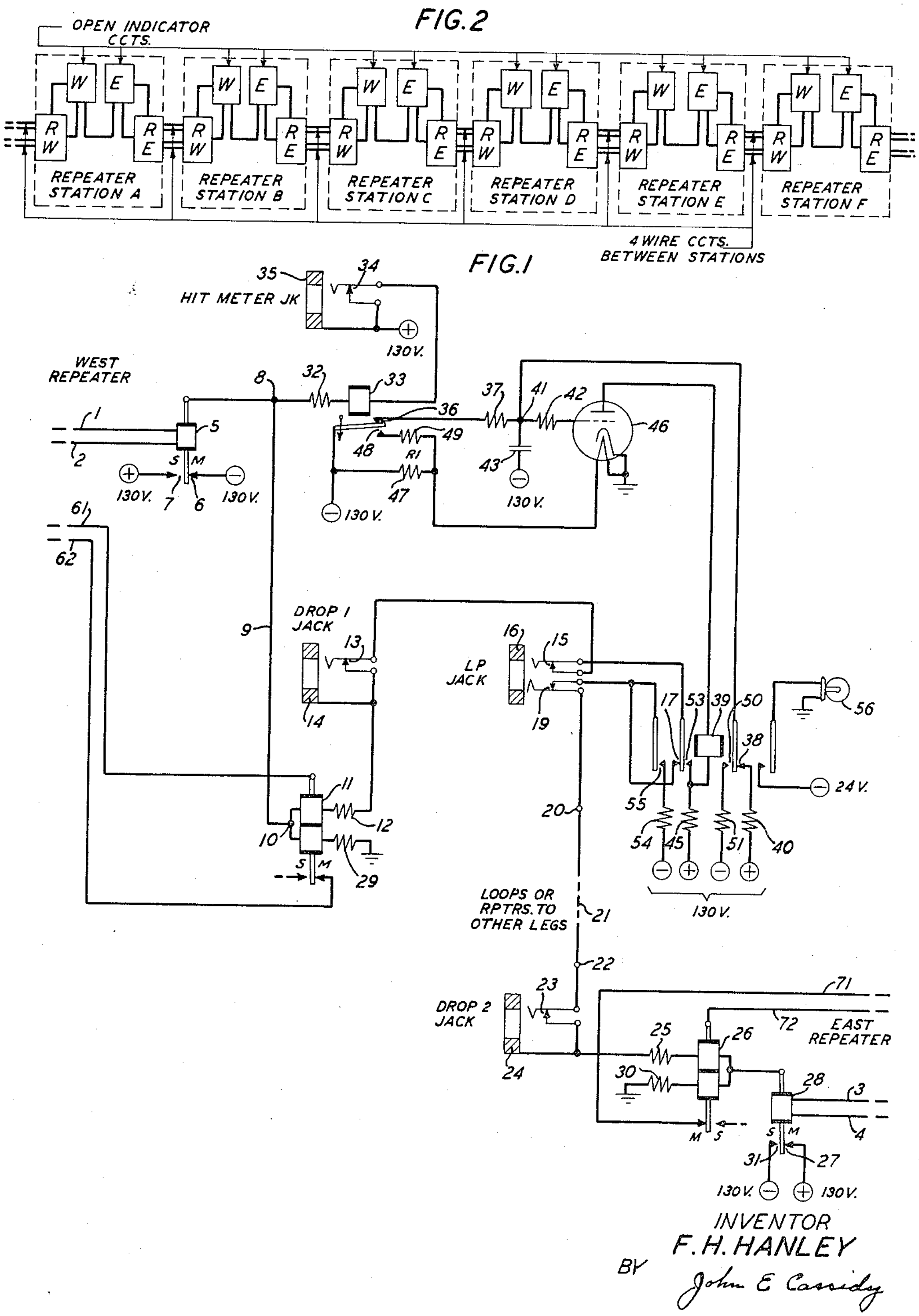

This application is a division of my copending original application Serial No. 40,952, filed July 27, 1948, subject Open Telegraph Line Indicator, now Patent No. 2,625,608, which original application discloses a circuit for affording an indication at connected stations that a telegraph line to which the stations are connected is open. The circuit of the original application includes a telegraph signal transmitter which transmits a code signal combination corresponding to a particular preassigned character in a telegraph signal code. The code signal transmitter is the subject of the present application.

An object of the present invention is the improvement of telegraph systems. A more particular object of the present invention is the provision of a simple inexpensive circuit which will generate and transmit a telegraph signal combination corresponding to a particular character in a telegraph signal code.

A feature of the invention is a space discharge device having an output circuit which includes a telegraph signal transmitting element responsive to the device, which element in turn controls a potential timing circuit comprising a condenser-resistance arrangement connectable to the input of the device. The period of activation of the device and of the transmitting element are therefore mutually controlled. The timing circuit for the activated and inactivated condition of the space discharge device may be established at desired intervals by changing the magnitudes of the elements in the condenser-resistance circuit responsive to the actuation of the transmitting device.

In the present arrangement, in the interest of economy, a single signal combination of a two-element permutation code is generated and transmitted. The signal combination which has been selected is one which may be generated with a relatively few inexpensive apparatus elements. However, the invention is not so limited. Any signal combination of the two-element permutation code, or of the Morse code, or of other codes may be generated and transmitted according to the principles of the present invention.

In the present embodiment, the invention is incorporated in an open telegraph line indicator circuit in a direct-current telegraph system. When a telegraph line section becomes open, the open telegraph line indicator circuit is responsively set into operation. The telegraph code signal generator is automatically operated responsive to the operation of the open line indicator circuit to generate and transmit a particular preselected telegraph code signal combination. In the present embodiment the signal generator generates a single code combination of the two-element start-stop teletypewriter permutation signal code. The code combination which has been selected for generation and transmittal is that defining the so-called "letters" function in the code.

The open line is the most common type of trouble on telegraph circuits. In the modern teletypewriter systems particularly on circuits having many stations such trouble causes great difficulty for the maintenance forces. The open line usually affects all drops on a circuit and therefore in the majority of cases all customers on the circuit will call the particular maintenance force serving their respective lines to report the trouble. The difficulty caused by this is in proportion to the complexity of the circuit and the number of customers' stations connected to the circuit.

In the case of a trouble expectancy of one open circuit per year per repeater section and five-tenths open circuit per year per drop, a simple circuit of one repeater section and two drops would have two troubles per year and four customers' calls reporting the two troubles per year. Assuming the same trouble expectancy on a complicated circuit of fifty sections and one hundred drops there would be one hundred opens per year and assuming that each open were reported by each customer, there would be ten thousand customers' calls reporting the hundred trouble conditions on the circuit. On a complicated circuit having fifty sections, since a trouble may occur in any one of the fifty sections or in any one of the hundred drops, considerable interoffice communication and much time are repuired to locate the trouble. In addition, many of the customers' calls to report the trouble are made over toll message circuits, and the answering of the calls tends to delay the work required to sectionalize the trouble.

The open line indicator circuit herein is designed to reduce customers' calls reporting the open condition and to reduce the work involved in locating the particular section on which the open occurs. The open indicator circuit of the present invention is arranged to operate in response to an open line condition exceeding a given maximum permissible duration from a given direction and to operate an alarm in the test room at each end of a repeater section in which the open occurs. The present circuit is also arranged so that, when it is operated in response to an open, a certain teletypewriter character for example, "the letters" character is sent to every test room and station on the circuit except those two test rooms immediately adjoining the open section which are notified of this condition by the operated alarm. The teletypewriter character is transmitted at a fixed uniform rate which may for instance be one character per second. This repeated character serves as an indication to the customers and to the attendants at the various test rooms that the maintenance force at the test rooms adjacent the open has been apprised of the open condition and that it is not therefore necessary to report or to sectionalize the trouble.

The number of the present circuits required on a particular telegraph interconnection will depend upon whether the present circuit is to be used simply in reducing customers' calls in reporting the open condition or is to be used for sectionalizing opens or for other purposes. If it is required only for reducing customers' calls in reporting the open condition it may be installed only at offices serving large numbers of outlying drops. If it is to serve for sectionalizing opens, two or more of the present circuits will be required at each office in the main path of transmission of the circuit.

The invention may be understood from the following detailed description when read with reference to the associated drawing which taken together disclose a preferred embodiment of the invention. It is to be understood, however, that the invention is not limited to the particular embodiment disclosed herein but may be incorporated in other embodiments which will be readily suggested, to those skilled in the art, by the present disclosure.

Referring now to the drawing:

Fig. 1 shows a four-wire direct-current telegraph line to the west interconnected to a four-wire direct-current telegraph line to the east through a west repeater and an east repeater located at the repeater station. Connected to the west repeater at the repeater station is an open line indicator circuit. It is to be understood that an open line indicator identical with that shown connected to the west repeater will ordinarily be connected to the east repeater in the same manner as shown for the west repeater.

Fig. 2 indicates schematically a direct-current telegraph system having six repeater stations, stations A, B, C, D, E and F interconnected in tandem between stations by a four-wire circuit. Each of the stations has two repeaters indicated by rectangles, shown as RW for a west repeater and as RE for an east repeater, connected to each of which repeaters is an individual open line indicator shown by a rectangle, and designated W for the west and E for the east open indicator.

In Fig. 1, the circuit is shown in the non-operated condition. Conductors 1 and 2 are the receiving pair of a four-wire telegraph circuit and may be assumed to extend to a distant repeater to the west and conductors 3 and 4 are the receiving pair of a four-wire telegraph circuit and may be assumed to extend to a distant repeater to the east. Conductors 61 and 62 are the sending pair of the four-wire circuit to the west and conductors 71 and 72 are the sending pair of the four-wire circuit to the east. When marking current flows in conductors 1 and 2 the armature of relay 5 is actuated to engage marking contact 6. When spacing current flows in conductors 1 and 2 the armature of relay 5 is actuated to engage its spacing contact 7. When the armature of relay 5 is in engagement with marking contact 6 a circuit may be traced from negative telegraph battery through contact 6 to junction 8 where it divides into parallel paths. From junction 8, the transmission branch of the circuit extends through conductor 9 to the apex 10 of relay 11, where it again divides. The main transmission branch continues through the top winding of relay 11, through resistance 12, contact 13 of drop jack 14, contact 15 of loop jack 16, contact 17 of relay 39 and contact 19 of loop jack 16 to terminal 20. From terminal 20 the connection extends in a continuous circuit through other repeaters, indicated by dotted connection 21, to terminal 22, from which point the circuit continues through contact 23 of drop jack 24, resistance 25, top winding of relay 26 and the armature and marking contact 27 of relay 28 to positive battery. From apex 10 a branch of the circuit extends through the bottom winding of relay 11 and resistance 29 to ground.

In the case of relay 11, the current through its top winding tends to actuate its armature to its right-hand or marking contact. This effect is opposed by current flowing through the bottom or biasing winding of relay 11, which effect tends to actuate the armature of relay to its left-hand or spacing contact. The effect of the current through the top winding of relay 11, however, is dominant for this condition and the armature of relay 11 is maintained in engagement with its right-hand or marking contact. In the case of relay 26, the effect of the current through its top winding tends to actuate its armature to its left-hand or marking contact and is dominant over the effect of current flowing from positive battery through contact 27, bottom winding of relay 26, and resistance 30 to ground, tending to actuate the armature of relay 26 towards its right-hand or spacing contact, and the armature of relay 26 is maintained in engagement with its left-hand or marking contact for this condition. When the armature of relay 5 is actuated to its spacing contact 7, positive battery is connected to each end of the circuit through the repeater. No current flows through the top windings of relays 11 and 26. The current through the bottom winding of relay 11 is reversed for this condition however, and the armature of relay 11 is therefore maintained in engagement with its right-hand or marking contact. This relay 11 is not affected by signals transmitted from relay 5. In the case of relay 26, as the current through its top winding falls, its armature is actuated to its right-hand or spacing contact under the influence of the current through its bottom winding. Thus relay 26 will respond to signals transmitted from relay 5. When transmission is from the east repeater toward the west repeater, relay 28 will be actuated between its marking and spacing contacts. Relay 26 will be maintained in its marking condition while the communication continues in the same manner as was relay 11 for the opposite direction of transmission. Relay 11 will respond to the signals transmitted by relay 28 in the same manner as did relay 26 for the signals transmitted from relay 5.

From junction point 8 a branch circuit may be traced which extends through resistance 32, winding of relay 33 and contact 34 of hit meter jack 35 to positive battery. Relay 33 is a slow to release relay. When the armature of relay 5 is maintained in engagement with its marking contact 6, so that negative battery is connected to the left-hand terminal of relay 33 while positive battery is connected to its right-hand terminal, relay 33 will remain in the actuated condition. During communication the armature of relay 5 will engage spacing contact 7 for each spacing signal. The duration of normal spacing signals will be short enough so that relay 33 will not release. However, for an open condition, the armature of relay 5 will engage spacing contact 7 and remain in engagement therewith for a protracted period, under which condition relay 33 will release.

While relay 33 is in the operated condition, a circuit may be traced from negative battery through contact 36 and resistance 37 to junction 41, where it branches. One branch extends through contact 38 of relay 39 and resistance 40 to positive battery. From junction 41 a branch extends through resistance 42 to the grid of space discharge device 46, which may, for instance, be a triode having an indirectly heated cathode. Connected to junction 41, also, is a branch which extends through condenser 43 to negative battery. A circuit may be traced from positive plate battery through resistance 45 and the winding of relay 39 to the plate of tube 46. When the hit indicator circuit is in the normal unoperated condition, the filament circuit of tube 46 extends from negative battery through resistance 47 and the filament of tube 46 to ground. Insufficient current flows in the filament circuit for this condition to properly heat the indirectly heated cathode in the tube. When an open occurs, tube 46 and its associated connections perform two functions in the present circuit. The filament circuit is used to control the predetermined interval of duration of an open line condition for which the circuit is to operate and the grid circuit is used to control the lengths of the marking and spacing pulses comprising the teletypewriter character which is transmitted to indicate the open condition to the connected stations and the rate at which the transmitted character is repeated. The current through the filament is controlled by the magnitude of resistance 47 so that the time required for the cathode of tube 46 to reach the proper operating temperature may be made to correspond to the duration of an open circuit condition for which it is desired to have the open indicator circuit operate.

When an open circuit condition of a fixed predetermined length is received from the west repeater, relay 33 will release opening contact 36, disconnecting negative battery from the top plate of condenser 43. When relay 33 releases, contact 48 will be closed and resistance 49 will be connected in parallel with resistance 47 in the filament battery supply circuit. After a second predetermined interval has elapsed the cathode of tube 46 will reach its normal operating temperature. During this interval condenser 43 will be charged by positive battery through resistance 40 and contact 38. When the grid is made sufficiently positive with respect to the cathode, tube 46 will operate, energizing the winding of relay 39 and actuating the contacts of relay 39 to their alternate positions.

The opening of contact 38 disconnects positive battery from the top plate of condenser 43. The closing of contact 50 connects negative battery through resistance 51 and contact 50 to the top plate of condenser 43, charging condenser 43 negatively. This, in turn, reduces the current in the plate circuit to a value below the release value of relay 39, so that after a third predetermined interval relay 39 releases. Upon the release of relay 39, positive battery will again be reconnected to the top plate of the condenser and the cycle will be repeated. This will continue as long as the open circuit condition of conductors 1 and 2 persists and while relay 33 remains released. The lengths of the intervals during which relay 39 is operated and released are controlled by the magnitudes of the potentials of the batteries, and resistances 40 and 51 and of the capacitance of condenser 43.

These operated and released intervals are fixed so that the "letters" character in the five element two-condition telegraph permutation code is transmitted over the telegraph circuit. The "letters" character is considered most suitable for transmission as it has the least effect on teletypewriter copy and causes no damage to the platen of the teletypewriter sets. Tests indicate that this character repeated once per second is satisfactory. In order to achieve this, relay 39 is held operated for about one second and then maintained in the released condition for about twenty-two milliseconds. When relay 39 is operated, the telegraph circuit interconnecting the west repeater and the east repeater is opened at contact 17 and positive telegraph battery is connected through resistance 45 and contact 53 to the west repeater. At the same time negative telegraph battery is connected through resistance 54 and contact 55 to the east repeater. This maintains the west repeater and the east repeater in the closed condition. When relay 39 is released the transmission conductor is reconnected through the closure of contact 17. However, on such closure of contact 17, when an open condition prevails on conductors 1 and 2, relay 5 is in its spacing condition and a spacing signal is transmitted toward the east and through all repeaters connected to the intact portion of the circuit. This results in the transmission of marking signals one second long and spacing signals twenty-two milliseconds long alternately to all loops and repeaters on the east side of the circuit, so that all teletypewriters on drops connected thereto will register repeated "letters." Each time relay 39 is operated, lamp 56 will be lighted over an obvious circuit notifying the attendant that the line to the adjacent station is open.

When the open condition assumed to be existing on conductors 1 and 2 is corrected, relay 5 will be operated to reengage with its marking contact 6. In responsive to this, relay 33 will be reoperated and the circuit will be restored to the normal condition.

If normal communication signaling is resumed as soon as the open condition is corrected and before the filament of tube 46 has had time to cool off it will cause no difficulty since relay 33 is held operated during normal communication and relay 39 will not be again operated.

It is to be understood that the open line indicator shown is individual to the west repeater. At each station there are two repeaters connected in tandem in the telegraph channel, a west repeater and an east repeater as indicated in Figs. 1 and 2. A separate open line indicator individual to the east repeater and connected thereto in the same manner as the open line indicator shown in detail as connected to the west repeater will ordinarily be provided.

When the present arrangement is used for sectionalizing opens, each hit locater lead, well understood in the art, which usually extends from a point corresponding to junction point 8 through a hit meter jack, such as jack 35, to battery, at all test rooms in the main transmission path, will be equipped with one of the present circuits. Under such conditions assuming test rooms A, B, C, D, E and F connected in tandem, in alphabetical sequence, in the main transmission path, as indicated in Fig. 2, when an open occurs on the main path, the particular open indicator circuit at each of the test rooms connected directly to the terminals of the section in which the open occurs, and these two open indicator circuits only, will be operated. For example, if an open occurs between test rooms C and D, the east open indicator at station C and the west open indicator at station D will both be operated and their operation will cause long marks and short spaces, corresponding to the "letters" signal combination in the multielement permutation telegraph signal code, to be sent to all of the other test rooms on the circuit. The code combination transmitted from test room C will be received at test rooms B and A while that transmitted from test room D will be received at test rooms E and F. This continued transmission prevents the release of the relay corresponding to relay 33 at all other offices and thus prevents the open indicator circuit from operating at all points other than at the terminals of the section in which the open occurs. The lighting of lamp such as lamp 56 in the open indicator circuit at each of test rooms C and D will serve as an indication that the open exists in the circuit between these two test rooms.

In order to prevent the momentary operation of the open indicator circuits at test rooms other than those adjacent to the trouble, the timing of the devices on each direction of transmission may be made of progressively longer duration for each succeeding office along the transmission path.

When an open occurs on a section of a side leg to an outlying point, that office only which is adjacent to the office serving the outlying point will get the alarm.

What is claimed is:

1. A telegraph system having a multielement permutation code telegraph signal transmitter, said transmitter comprising means for generating marking and spacing telegraph signal elements of predetermined duration according to a telegraph code, said means comprising a space discharge device, a timing circuit for controlling the activation and inactivation of said device for predetermined measured intervals, a condenser in said timing circuit, and a first and second charging circuit for said condenser, responsive to a first and a second condition of said device, a telegraph channel extending to a remote telegraph station, said channel connected to said transmitter, and means, connected to the output of said device, responsive to said charging circuit, for impressing multielement permutation code telegraph signals on said channel.

2. A telegraph system having a permutation code telegraph signal transmitter, said transmitter having means therein for generating marking and spacing signal elements of predetermined measured intervals according to a code, said transmitter comprising a space discharge device, a condenser timing control circuit connected to said device, a first charging circuit for said condenser responsive to a first condition of said device, a second charging circuit for said condenser responsive to a second condition of said device, said charging circuits controlling the duration of the activation and deactivation intervals of said device, a telegraph channel extending to a remote telegraph station, said channel connected to said transmitter, and means responsive to said activation and deactivation for transmitting a permutation code telegraph signal combination through said channel to said remote station.

3. A telegraph system having a telegraph signal transmitter, means in said transmitter for generating timed marking and spacing signal elements corresponding to a particular character in a multielement permutation telegraph signal code, said transmitter comprising a space discharge device, a magnetic relay responsive to said device and a time control circuit for said space discharge device responsive to said relay, said control circuit comprising means for measuring a plurality of predetermined intervals to define said character, a telegraph channel extending to a remote telegraph station, and means for actuating said relay to impress said marking and spacing signal elements on said channel.

4. A telegraph code signal combination transmitter having a space discharge device, an input circuit and an output circuit for said device, a telegraph code signal transmitting switch connected in and responsive to said output circuit, a potential timing device connected to and responsive to said switch, said timing device connectable also in said input circuit and a first and a second means in said timing device for measuring a first and a second interval each of predetermined duration corresponding to a marking signal element and a spacing signal element respectively, said intervals of differing durations, and a telegraph channel extending to a remote telegraph station connected to said switch, so as to transmit said marking and spacing signal elements through said channel to said station.

5. A telegraph code signal combination transmitter having a space discharge device, an input circuit and an output circuit for said device, a telegraph code signal transmitting switch connected in and responsive to said output circuit, a potential timing device connected to and responsive to said switch, said timing device connectable also in said input circuit, said timing device comprising a plurality of selectable impedance elements connectable to said input circuit for generating a sequence of predetermined timed signal intervals, said intervals corresponding to the marking and spacing intervals of a telegraph signal code combination, said intervals of differing durations, a telegraph channel extending to a remote telegraph station, said channel connected to said switch, so as to transmit said telegraph signal code combination to said remote station.

References Cited in the file of this patent

UNITED STATES PATENTS

| | | |
|---|---|---|
| 2,008,413 | Dawson | July 16, 1935 |
| 2,122,499 | Stocker | July 5, 1938 |
| 2,188,159 | Rockwood, Jr. | Jan. 23, 1940 |
| 2,410,442 | Hieronymus | Nov. 5, 1946 |
| 2,522,874 | Kahn | Sept. 19, 1950 |